United States Patent
Vaona et al.

(10) Patent No.: US 12,303,061 B2
(45) Date of Patent: May 20, 2025

(54) COFFEE MACHINE WITH IMPROVED DRIP TRAY

(71) Applicant: De'Longhi Appliances S.R.L., Treviso (IT)

(72) Inventors: Marco Vaona, Treviso (IT); Davide Sgnaolin, Treviso (IT); Guido Quaratesi, Treviso (IT)

(73) Assignee: De'Longhi Appliances S.R.L., Treviso (IT)

(*) Notice: Subject to any disclaimer, the term of this patent is extended or adjusted under 35 U.S.C. 154(b) by 837 days.

(21) Appl. No.: 17/423,507

(22) PCT Filed: Jan. 20, 2020

(86) PCT No.: PCT/EP2020/051270
§ 371 (c)(1),
(2) Date: Jul. 16, 2021

(87) PCT Pub. No.: WO2020/152098
PCT Pub. Date: Jul. 30, 2020

(65) Prior Publication Data
US 2022/0110474 A1  Apr. 14, 2022

(30) Foreign Application Priority Data
Jan. 25, 2019 (IT) ........................ 102019000001175

(51) Int. Cl.
*A47J 31/44* (2006.01)
(52) U.S. Cl.
CPC ........ *A47J 31/4428* (2013.01); *A47J 2203/00* (2013.01)

(58) Field of Classification Search
CPC ..... A47J 31/4425; A47J 31/4428; B67D 1/16; Y10T 137/5762
(Continued)

(56) References Cited

U.S. PATENT DOCUMENTS

| 9,032,664 B2* | 5/2015 | Yusibov ................. A01G 31/06 47/62 N |
| 2007/0266861 A1* | 11/2007 | Hart ..................... A47J 31/4403 99/279 |
| 2014/0007777 A1* | 1/2014 | Sweet ..................... A47J 31/58 99/290 |

FOREIGN PATENT DOCUMENTS

| CN | 107928425 A | * | 4/2018 | |
| DE | 102009027499 A1 | * | 1/2011 | .......... A47J 31/4428 |

(Continued)

OTHER PUBLICATIONS

International Search Report dated Apr. 17, 2020; International Application No. PCT/EP2020/051270; International Filing Date: Jan. 20, 2020; 3 pages.

(Continued)

*Primary Examiner* — Jimmy Chou
*Assistant Examiner* — William C. Gibson
(74) *Attorney, Agent, or Firm* — Blank Rome LLP

(57) ABSTRACT

The coffee machine comprises a drip tray (1), in turn comprising a container (2) and a covering grille (3) for covering the container (2), the grille (3) being provided with a plurality of openings (12) for the passage of the liquids to the container (2), the tray (1) further comprising a plurality of vertical protrusions (13) passing through the openings (12) and defining with the upper ends thereof a resting surface that is raised with respect to the outer surface (15) of the grille (3).

15 Claims, 5 Drawing Sheets

(58) Field of Classification Search
USPC .......... 99/280, 284, 285, 286, 290, 295, 300
See application file for complete search history.

(56) References Cited

FOREIGN PATENT DOCUMENTS

| | | | | |
|---|---|---|---|---|
| DE | 102015205123 A1 * | 9/2016 | .............. | A47J 31/44 |
| EP | 1731065 A1 | 12/2006 | | |
| EP | 2067422 A2 * | 6/2009 | .......... | A47J 31/4428 |
| FR | 2992155 A1 | 12/2013 | | |
| GB | 2528725 A | 2/2016 | | |
| WO | WO-2014162236 A2 * | 10/2014 | .............. | A47J 31/42 |

OTHER PUBLICATIONS

Written Opinion dated Apr. 27, 2020; International Application No. PCT/EP2020/051270; International Filing Date: Jan. 20, 2020; 5 pages.
English translation; French Published Application No. FR2992155; Publication Date: Dec. 27, 2013; 16 pages.

* cited by examiner

COFFEE MACHINE WITH IMPROVED DRIP TRAY

RELATED APPLICATIONS

This application is a U.S. national phase application of International Application No. PCT/EP2020/051270, filed Jan. 20, 2020; which application claims benefit of priority of Italy Application No. 102019000001175, filed Jan. 25, 2019. Each of the above-identified related applications are incorporated by reference.

FIELD OF USE

The present invention relates to a coffee machine with an improved drip tray.

BACKGROUND OF THE INVENTION

Coffee machines are known on the market having a drip tray formed by a container equipped with an upper grille having through openings for the drainage of liquids towards the container.

The drip tray is positioned in the front area of the machine below the coffee dispensers and the grille acts as a horizontal surface for the resting of cups into which the beverage is dispensed and possibly also for the resting of other components and accessories such as for example the water tank and/or the milk jug.

The grille can be made of quality material, and in particular metal material subjected to a surface finishing process, e.g. chrome-plated steel.

The grille is indissolubly integrated with a separate and structurally independent support body made of a different material, typically plastic.

The continuous handling of objects on the grille exposes it to a constant risk of damage.

In particular, impacts and sliding of the cups and other components or accessories that are handled on the grill can scratch, dent or damage the grille so as to quickly deteriorate the aesthetics thereof and consequently also that of the entire coffee machine.

Furthermore, as the grill is susceptible to getting dirty easily because of dripping particularly from the coffee dispenser above, it must be cleaned again frequently. The correct and complete cleaning operation can be complicated, particularly in the case in which the grille is made of the assembly of separate and distinct pieces that in the joining areas can create recesses that are difficult to access for the user and also difficult to reach by the liquid washing detergents.

SUMMARY OF THE INVENTION

The technical task of the present invention is, therefore, to provide a coffee machine with a drip tray which obviates the above-described technical drawbacks of the prior art.

Within the context of this technical task an object of the invention is that of protecting the grille of the drip tray of a coffee machine against surface damage. Another object of the invention is that of making the drip tray of a coffee machine easy to inspect and to clean completely and correctly.

The final object of the invention is that of adding new functions to a drip tray of a coffee machine.

The technical task, as well as these and other objects, according to the present invention are achieved by making a coffee machine comprising a drip tray in turn comprising a container and a covering grille for covering the container, said grille being provided with a plurality of openings for the passage of the liquids to the container, characterized in that said tray comprises a plurality of vertical protrusions passing through said openings, the upper ends of the vertical protrusions defining a resting surface that is raised with respect to the outer surface of said grille.

Advantageously said protrusions are supported by a sole support.

Also advantageously said support is structurally separate and independent from said grille so that the two components can be easily engaged and disengaged. Advantageously said grille and said support rest on said container.

In a preferred embodiment of the invention said tray has inside the container a signal float for signalling the level of the liquids that is slidable vertically through one of said openings of the grille in an aligned position with one of said protrusions.

The special provision of the protrusions enables the cups and other components or accessories to be arranged in a raised position from the upper surface of the grille which is therefore extremely protected.

Another advantageous aspect of the invention consists of the ease of separating the support of the protrusions from the grille, with the result that both parts can be easily washed and cleaned separately from one another.

Other characteristics of the present invention are also defined in the following claims.

BRIEF DESCRIPTION OF THE DRAWINGS

Further characteristics and advantages of the invention will more fully emerge from the description of a preferred but not exclusive embodiment of the coffee machine with drip tray according to the finding, illustrated by way of non-limiting example in the accompanying drawings, in which.

DETAILED DESCRIPTION OF THE ILLUSTRATED EMBODIMENTS

Figure 1:
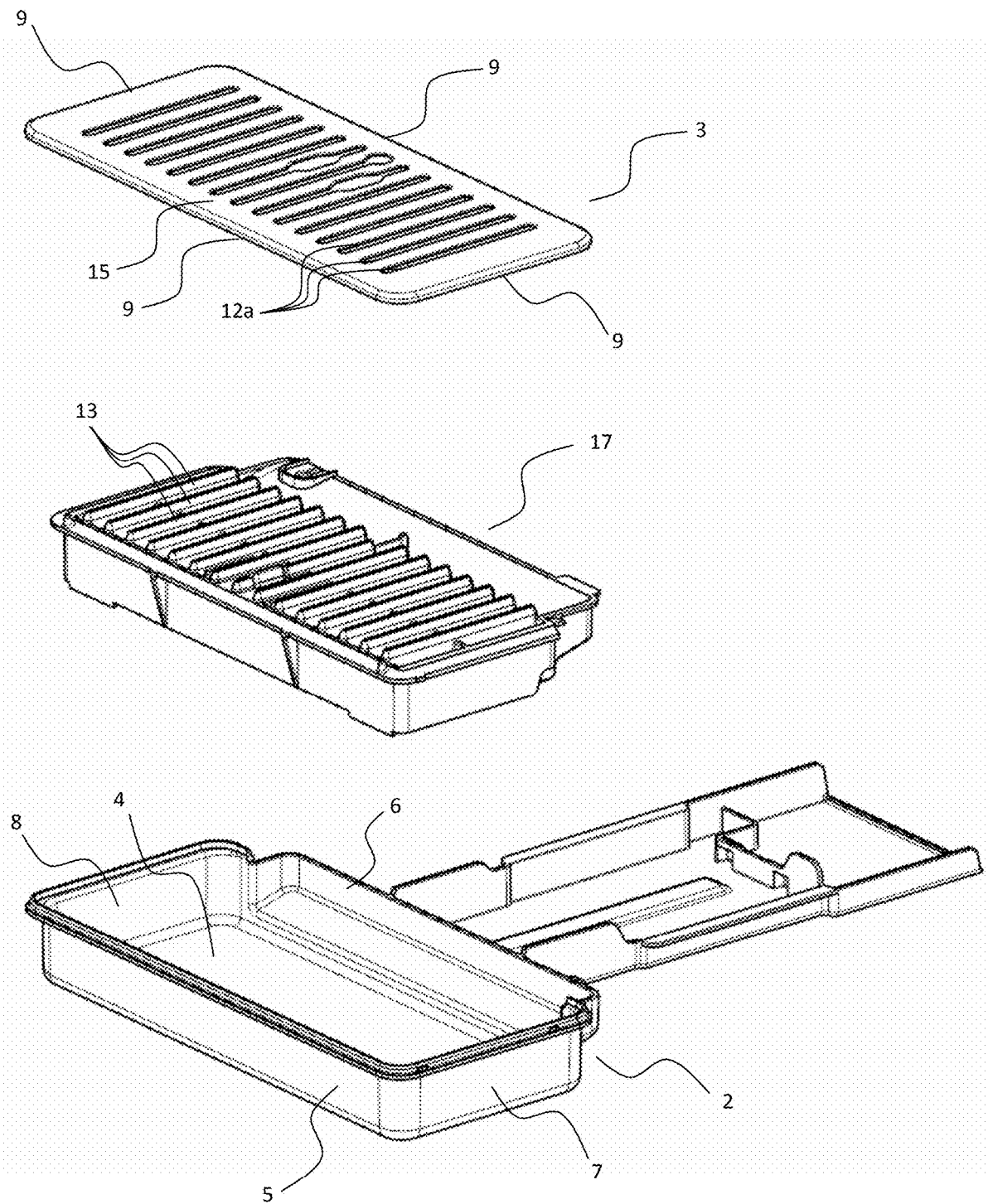
FIG. 1 shows an exploded view from above of a drip tray in accordance with the invention.
Figure 2:
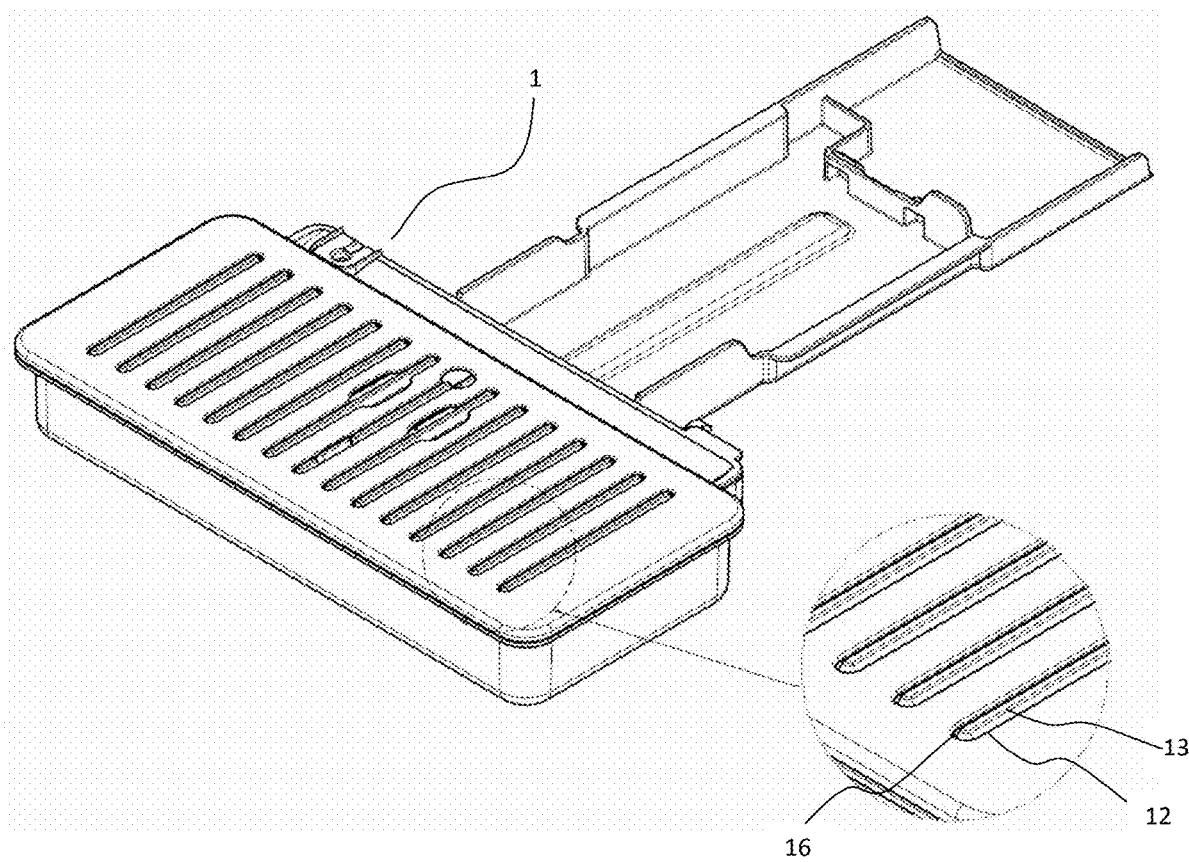
FIG. 2 shows a view from above of the drip tray of FIG. 1 assembled and with an enlarged detail.
Figure 3:
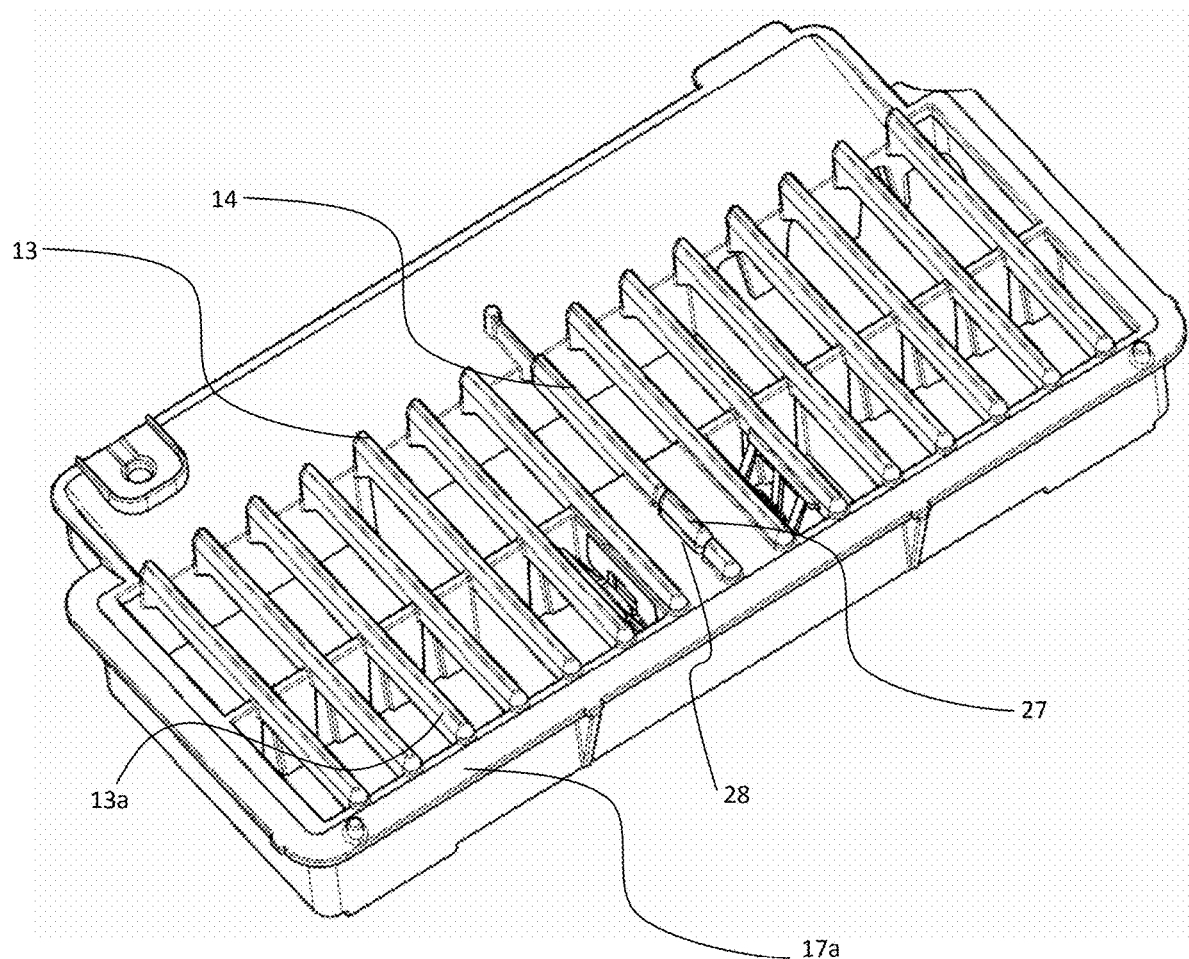
FIG. 3 shows a view from above of the support provided in the drip tray of FIG. 1.
Figure 4:
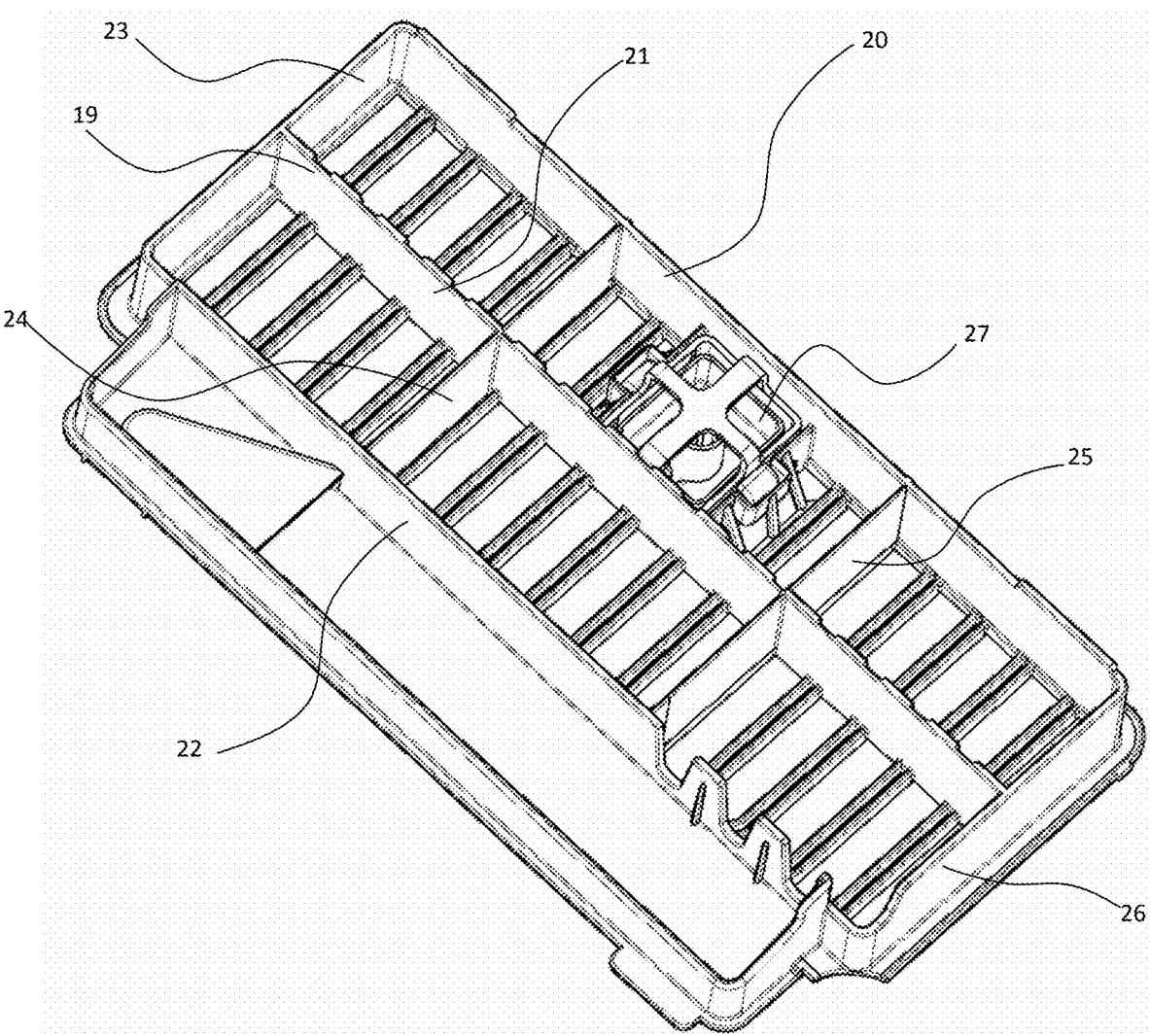
FIG. 4 shows a view from below of the support provided in the drip tray of FIG. 1.
Figures 5, 6:
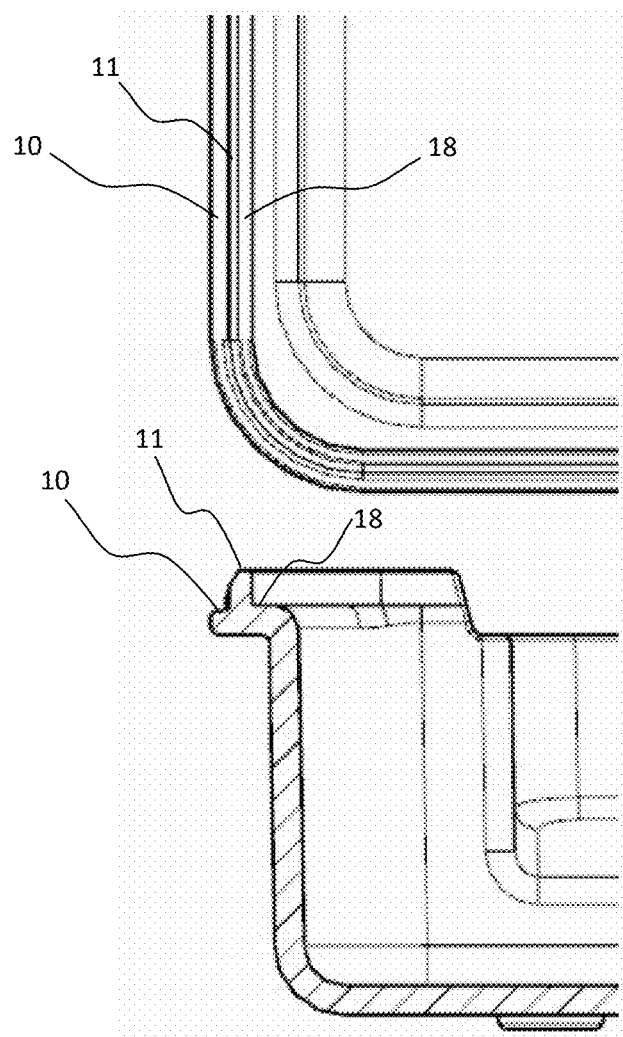
FIG. 5 shows a vertical section of a detail of the container provided in the assembled drip tray.
FIG. 6 shows a plan view of the detail of the container of FIG. 5.

With reference to the cited figures, a drip tray is shown indicated overall by reference number 1, which can be incorporated into a coffee machine of the known type (not shown).

The coffee machine in particular has at the base, in the front position, the collection tray above which the coffee dispenser is arranged, in an appropriately distanced position.

The drip tray 1 comprises a container 2 having an open top and a covering grille 3 for covering the open top of the container 2.

The container 2 is formed by a quadrangular bottom 4 from whose perimeter a front wall 5, a rear wall 6 and two side walls 7, 8 extend vertically.

The walls 5, 6, 7, 8 of the container 2 have an equal height so as to identify an upper perimeter edge 11 of the container 2 lying in a horizontal plane.

The grille 3, resting on the container 2, has a quadrangular conformation and is provided perimetrally with centring guides 9 that can be engaged with an external horizontal perimeter shoulder 10 of the upper edge 11 of the container 2.

In particular the grille 3 is formed by a flat metal sheet resting horizontally on the container 2 and having its perimeter edge turned downwards defining the centring guides 9.

The grille 3 may be made of metal with an aesthetic surface finish, e.g. chrome-plated steel.

The grille 3 is provided with a plurality of openings 12 for the passage of liquids to the container 2.

The passage openings 12 can have different shapes and sizes, and in the case illustrated by way of example they are formed by parallel rectilinear longitudinal slits 12a oriented in the anteroposterior direction of the grille 3.

Advantageously the drip tray 1 comprises a plurality of vertical protrusions 13 passing through the openings 12 of the grille 3 and defining with their upper ends 14 a resting surface that is raised with respect to the outer surface 15 of the grille 3. The protrusions 13 project with a portion of an equal height above the openings 12 so as to define a horizontal resting plane.

Each protrusion 13 delimits with the corresponding opening 12 a gap 16 for the passage of the liquids.

The gap 16 preferably extends along the entire perimeter of the opening 12.

It is not excluded that in some embodiments of the drip tray 1 the gap extends continuously or discontinuously along only one part of the perimeter of the opening 12.

Advantageously the protrusions 13 are supported by a sole support 17.

The support 17 is formed by a flat quadrangular frame 17a resting perimetrally on an inner horizontal perimeter shoulder 18 of the upper edge 11 of the container 2.

The protrusions 13 can have different shapes and sizes, and in the case illustrated by way of example they are formed by parallel rectilinear longitudinal bars 13a oriented in the anteroposterior direction of the support 17.

Such bars 13a have a lower cross section and length than the slits 12a so as to create a continuous perimeter gap 16.

More precisely the bars 13a extend in relief above the frame 17a between the front side and the rear side of the frame 17a itself.

Advantageously the support 17 is structurally separate and independent from the grille 3.

Preferably the protrusions 13 are made as a single piece with the support 17.

In particular, the protrusions 13 and the support 17 are formed by a single piece made of moulded plastic.

In the illustrated version of the drip tray 1, a splash guard means 19 is connected to the support 17, which extends below the support 17 and inside the container 2.

The splash guard means 19 comprises a series of vertical dividers 20, 21, 22 that divide up the inner volume of the container 2.

By way of example a first series of dividers 20, 21, 22 is shown, which extend orthogonally between the flank sides of the frame 17a, and a second series of dividers 23, 24, 25, 26 that intersect the first series of dividers 20, 21, 22 and extend orthogonally between the front side and the rear side of the frame 17a.

Obviously the number, shape and size of the dividers can be different from those just illustrated.

In the illustrated case the splash guard means 19 is supported directly by the support 17, and is preferably made as a single piece with the support 17 and with the protrusions 13.

In an embodiment of the drip tray 1 not illustrated, the splash guard means 19 can be made by an element disconnected from the support 17 and simply resting on the bottom of the container 2 or constrained in another way to the inside of the container 2.

The drip tray 1 has inside the container 2 a signal float 27 for signalling the level reached by the liquids.

The signal float 27 is vertically slidable through one of the openings 12 of the grille 3 where one of the protrusions 13 is present.

In this case the maximum allowable level of filling the container 2 can be identified when the top of the signal float 27 which is raised due to the effect of the rising level of the liquids present in the container 2 reaches or goes past the top of the protrusion 13.

To make the reaching of the threshold level even clearer, in the illustrated version the signal float 27, which can have a dedicated colour, is slidable along an interruption 28 of one of the longitudinal bars 13a that forms a protrusion 13.

In practice, the cups or other accessories or components of the coffee machine can rest directly on the surface defined by the crests of the protrusions 13 without contact with the grille 3 which therefore does not suffer any scratches, dents or other damage due to impact or rubbing.

The surface finish of the grille 3 can therefore be kept intact and the aesthetics of the machine do not deteriorate over time.

On the other hand, as the grill 3 simply rests on the container 2 and can be easily raised and detached to be inspected and/or cleaned, the support 17 also simply rests on the container 2 and can be easily raised and detached to be inspected and/or cleaned from the grille 3.

It is not excluded that in one embodiment of the drip tray the grille can have snap teeth that can be rearmed by hand for an easily removable engagement with the container or with the support.

The coffee machine with drip tray as conceived herein is susceptible to many modifications and variations, all falling within the scope of the inventive concept; furthermore, all the details are replaceable by technically equivalent elements.

In practice the materials used, as well as the dimensions, can be any according to the needs and the state of the art.

The invention claimed is:

1. A coffee machine comprising a drip tray (1), the drip tray (1) comprising:
    a container (2);
    a covering grille (3) that covers the container (2), the covering grille (3) having a plurality of openings (12), each of the plurality of openings (12) configured to allow a passage of liquids from a top of, and through, the covering grille (3) directly into the container (2); and
    a plurality of vertical protrusions (13) configured to pass through the plurality of openings (12), wherein:
        each one of the plurality of openings (12) includes at least one vertical protrusion (13) passing therethrough;
        each vertical protrusion (13) is configured, in length and/or width, to allow the passage of liquids thereby from the top of the covering grille (3), through the respective opening (12), directly into the container (2);

each vertical protrusion (13) has an upper end, where the collective upper ends of the plurality of vertical protrusions (13) define a resting surface, configured for cups to rest during coffee delivery, where the collective upper ends of all vertical protrusions (13), during coffee machine operation, are horizontal, are fixed in place and are in a raised position relative to a top surface (15) of the covering grille (3); and said vertical protrusions (13) are supported by a support (17), and said support (17) is connected to a splash guard (19) positioned inside the container (2).

2. The coffee machine according to claim 1, wherein each vertical protrusion (13) and corresponding opening (12) delimit a gap (16) between the respective vertical protrusion and the corresponding opening (12) for the passage of the liquids through the corresponding opening (12).

3. The coffee machine according to claim 2, wherein said gap (16) extends along an entire perimeter of said opening (12).

4. The coffee machine according to claim 1, wherein said support (17) is structurally separated from and independent of said grille (3).

5. The coffee machine according to claim 1, wherein said grille (3) and said support (17) rest on said container (2).

6. The coffee machine according to claim 1, wherein said vertical protrusions (13) are made as a single piece with said support (17).

7. The coffee machine according to claim 1, wherein said support (17) and said splash guard (19) are made as a single piece made of plastics.

8. The coffee machine according to claim 1, wherein said drip tray (1) has a signal float (27) signaling a level of the liquids flowable vertically through at least one of said plurality of openings (12) of the grille (3).

9. The coffee machine according to claim 1, wherein each of said plurality of openings (12) comprise longitudinal slits (12a) and each of said vertical protrusions (13) comprise longitudinal bars (13a), where each longitudinal bar (13a) has a width less than a width of the respectively corresponding slit (12a), and has a length less than a length of the respectively corresponding slit (12a).

10. The coffee machine according to claim 8, wherein said signal float (27) is slidable along an interruption in one of a longitudinal bar (13a) of said vertical protrusions (13).

11. The coffee machine according to claim 1, wherein said covering grille (3) is made of metal.

12. A drip tray (1) for a coffee machine, the drip tray (1) comprising:
a container (2);
a covering grille (3) that covers the container (2), the covering grille (3) having a plurality of openings (12), each of the plurality of openings (12) configured to allow a passage of liquids from a top of, and through, the covering grille (3) directly into the container (2);
a plurality of vertical protrusions (13) configured to pass through the plurality of openings (12); and
a signal float (27) signaling a level of the liquids flowable vertically through at least one of said plurality of openings (12) of the grille (3), said signal float (27) being slidable along an interruption in a longitudinal bar (13a) of the vertical protrusions (13); wherein:
each one of the plurality of openings (12) includes at least one vertical protrusion (13) passing therethrough;
each vertical protrusion (13) is configured, in length and/or width, to allow the passage of liquids thereby from the top of the covering grille (3), through the respective opening (12), directly into the container (2);
each vertical protrusion (13) has an upper end, where the collective upper ends of the plurality of vertical protrusions (13) define a resting surface, configured for cups to rest during coffee delivery, where the collective upper ends of all vertical protrusions (13), during coffee machine operation, are horizontal, are fixed in place and are in a raised position relative to a top surface (15) of the covering grille (3).

13. The coffee machine according to claim 1, wherein:
each one of the plurality of openings (12) is configured as a slit and includes one vertical protrusion (13) passing therethrough;
each vertical protrusion (13) is configured as a longitudinal bar (13a), where each longitudinal bar (13a) has a width less than a width of the respectively corresponding slit (12a), and has a length less than a length of the respectively corresponding slit (12a); and
each longitudinal bar (13a) and corresponding opening (12) slit delimit a gap (16) extending along and within an entire perimeter of the corresponding opening (12), the gap (16) facilitating the passage of the liquids through the corresponding opening (12).

14. The drip tray (1) for a coffee machine according to claim 12, wherein:
each one of the plurality of openings (12) is configured as a slit and includes one vertical protrusion (13) passing therethrough;
each vertical protrusion (13) is configured as a longitudinal bar (13a), where each longitudinal bar (13a) has a width less than a width of the respectively corresponding slit (12a), and has a length less than a length of the respectively corresponding slit (12a); and
each longitudinal bar (13a) and corresponding opening (12) slit delimit a gap (16) extending along and within an entire perimeter of the corresponding opening (12), the gap (16) facilitating the passage of the liquids through the corresponding opening (12).

15. A coffee machine comprising a drip tray (1), the drip tray (1) comprising:
a container (2);
a covering grille (3) that covers the container (2), the covering grille (3) having a plurality of openings (12), each of the plurality of openings (12) configured to allow a passage of liquids from a top of, and through, the covering grille (3) directly into the container (2);
a plurality of vertical protrusions (13) configured to pass through the plurality of openings (12); and
a signal float (27) signaling a level of the liquids flowable vertically through at least one of said plurality of openings (12) of the grille (3), said signal float (27) being slidable along an interruption in a longitudinal bar (13a) of the vertical protrusions (13); wherein:
each one of the plurality of openings (12) includes at least one vertical protrusion (13) passing therethrough;
each vertical protrusion (13) is configured, in length and/or width, to allow the passage of liquids thereby from the top of the covering grille (3), through the respective opening (12), directly into the container (2);
each vertical protrusion (13) has an upper end, where the collective upper ends of the plurality of vertical protrusions (13) define a resting surface, configured for cups to rest during coffee delivery, where the collective upper ends of all vertical protrusions (13), during coffee machine operation, are horizontal, are fixed in place and are in a raised position relative to a top surface (15) of the covering grille (3).

* * * * *